United States Patent [19]
Tomita

[11] Patent Number: 5,280,466
[45] Date of Patent: Jan. 18, 1994

[54] OPTICAL DISC AND APPARATUS FOR REPRODUCING SIGNALS RECORDED ON THE SAME

[75] Inventor: Yoshimi Tomita, Tsurugashima, Japan

[73] Assignee: Pioneer Electronic Corporation, Tokyo, Japan

[21] Appl. No.: 964,283

[22] Filed: Oct. 21, 1992

[30] Foreign Application Priority Data

Nov. 19, 1991 [JP] Japan .................................. 3-303104
Jul. 21, 1992 [JP] Japan .................................. 4-193828

[51] Int. Cl.$^5$ .............................................. G11B 7/00
[52] U.S. Cl. ....................... 369/275.1; 369/275.3; 369/99; 369/43; 369/44.26
[58] Field of Search ............... 369/43, 44.25, 44.26, 369/44.32, 44.37, 44.41, 99, 275.1, 275.2, 275.3, 275.4, 275.5

[56] References Cited
U.S. PATENT DOCUMENTS

5,181,161 1/1993 Hirose et al. ..................... 369/109

Primary Examiner—Paul M. Dzierzynski
Assistant Examiner—Don Wong
Attorney, Agent, or Firm—Sughrue, Mion, Zinn, Macpeak & Seas

[57] ABSTRACT

An optical disc is provided with: a signal track formed on a signal recording surface of the optical disc; and a plurality of cross-talk detection areas each formed on a portion of the signal track and including pits for detecting a cross-talk. The signals are recorded on areas of the signal track other than the cross-talk detection areas. An apparatus for reproducing the signals recorded on the optical disk, is provided with: a device for receiving the reflected light and for generating read signals; a device for detecting the cross-talk detection areas, and for extracting signal components of the pits for detecting the cross-talk; a device for performing a predetermined operation on the extracted signal components and for generating a control signal; and a device for receiving the read signals and the control signal and for deriving a reproduced signal in which the cross-talk is eliminated.

15 Claims, 8 Drawing Sheets

OUTPUT OF PHOTODETECTOR 31
OUTPUT OF PHOTODETECTOR 32
OUTPUT OF PHOTODETECTOR 33

OPTICAL DISC AND APPARATUS FOR REPRODUCING SIGNALS RECORDED ON THE SAME

BACKGROUND OF THE INVENTION

1. Field of the Invention:

The present invention generally relates to optical discs and an apparatus for reproducing signals recorded on optical discs. More particularly, the present invention is concerned with an optical disc in which signals for canceling a cross talk are recorded on a plurality of signal tracks, and an apparatus for reproducing signals recorded on such an optical disc in which a cross talk is canceled using the signals read from the plurality of signal tracks.

2. Description of the Related Art:

As one of various types of optical discs, there is an optical disc in which a signal pit string formed on its signal recording surface is spirally arranged from an inner side of the optical disc to an outer side thereof. A plurality of tracks are formed by a plurality of turns of the signal pit string. In order to enhance the recording density and thus obtain a large storage capacity, several approaches may be taken. For example, the recording density can be improved by arranging an increased number of pits in a direction of tracks. It is also possible to improve the recording density by narrowing the size of a laser beam used for reading information recorded on the optical disc. It is also possible to increase the recording density by decreasing the track pitch.

The track pitch has a limited value dependent on the size of a light spot converged on the optical disc. If the track pitch is decreased without a change in the spot size, signals recorded on adjacent tracks will be read together with a signal recorded on the target track. Hence, the cross talk increases and it becomes difficult to reproduce only the signal recorded on the target track.

In order to reduce the influence of the cross talk as described above, the following method has been proposed. That is, three light spots are concurrently projected onto three respective adjacent tracks, and signals are read from the tracks by using lights reflected thereby. A cross talk mixed with the read signal of the center track is tried to be cancelled by using the read signals of the other two tracks. For example, Japanese Patent Application Laid-Open Publication No. 3-40225 discloses a cross-talk cancelling method using a variable frequency filter. In this method, a frequency characteristic (filter coefficients) of the variable frequency filter is varied to find an optimum point to reduce the cross talk component in the output signal thereof. Another cross-talk cancelling method has been proposed in which cancelling coefficients (filter coefficients) are calculated so that the signals read from the adjacent tracks would have no correlation (see "NIKKEI ELECTRONICS", Nikkei BP company, No. 495, Mar. 19, 1991, pp. 98-99).

However, the above cross-talk canceling methods have a disadvantage in that it takes a long time to obtain optimal filter coefficients and thus it is difficult to rapidly respond to a change in the state of the optical disc. Further, the above-mentioned cross-talk canceling methods are not capable of eliminating the influence of an asymmetrical aberration of a lens system (coma aberration) and a warp of the optical disc. Hence, in these cases, it is difficult to effectively reduce cross talk.

SUMMARY OF THE INVENTION

It is a general object of the present invention to provide an improved optical disc and an apparatus for reproducing signals recorded on the optical disc.

A more specific object of the present invention is to reduce a cross talk while enhancing the recording density and thus obtaining a large capacity of the optical disk.

The above object of the present invention can be achieved by an optical disc provided with: a signal track formed on a signal recording surface of the optical disc; and a plurality of cross-talk detection areas each formed on a portion of the signal track and including pits for detecting a cross-talk. The signals are recorded on areas of the signal track other than the cross-talk detection areas.

The above-mentioned object of the present invention can be also achieved by an apparatus for reproducing signals recorded on the above-mentioned optical disc of the present invention, by detecting a light reflected from the optical disc to which at least one light spot is projected. The reproducing apparatus is provided with: a light detection unit for receiving the reflected light and for generating read signals of a plurality of adjacent signal tracks of the optical disk; a cross-talk detection pit extracting unit, coupled to the light detection unit, for detecting the cross-talk detection areas from the read signals, and for extracting, from the read signals, signal components of the pits of detecting the cross-talk with respect to each signal track; an operation unit, coupled to the cross-talk detection pit extracting unit, for performing a predetermined operation on the extracted signal components, and for generating a control signal based on a result of the predetermined operation; and a read signal processing unit, coupled to the light detection unit and the operation unit, for receiving the read signals and the control signal and for deriving, from the read signals and the control signal, a reproduced signal in which the cross-talk is eliminated.

It is preferable that the read signal processing unit attenuates the amplitudes of the read signals other than a read signal of a target signal track on the basis of the control signal, and substracts attenuated read signals from the read signal of the target signal track. It is also preferable that the read signal processing unit varies the frequency characteristics of the read signals other than a read signal of a target signal track on the basis of the control signal, and subtracts the read signals having varied frequency characteristics from the read signal of the target signal track.

It is preferable that when three light spots are projected onto three (first, second and third) adjacent signal tracks, the light detection unit includes three photodetectors arranged so that read signals of the three adjacent signal tracks are obtained. In this case, it is preferable that a cross-talk signal contained in the read signal of the center signal track out of the three signal tracks of canceled by means of signals obtained by performing a predetermined operation of the read signals of the first and third signal tracks. It is also preferable that when only light spot is used in lieu of the above three light spots, the light detection unit includes three memories used for storing the read signals of the three adjacent signal tracks sequentially obtained by scanning the optical disc by the light spot.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

Figure 1A:
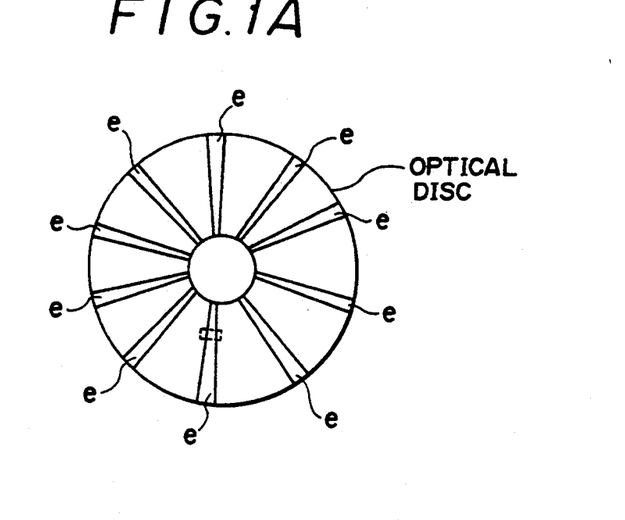
FIGS. 1A and 1B are diagrams showing a signal recording format of an optical disc according to an embodiment of the present invention.
Figure 1B:
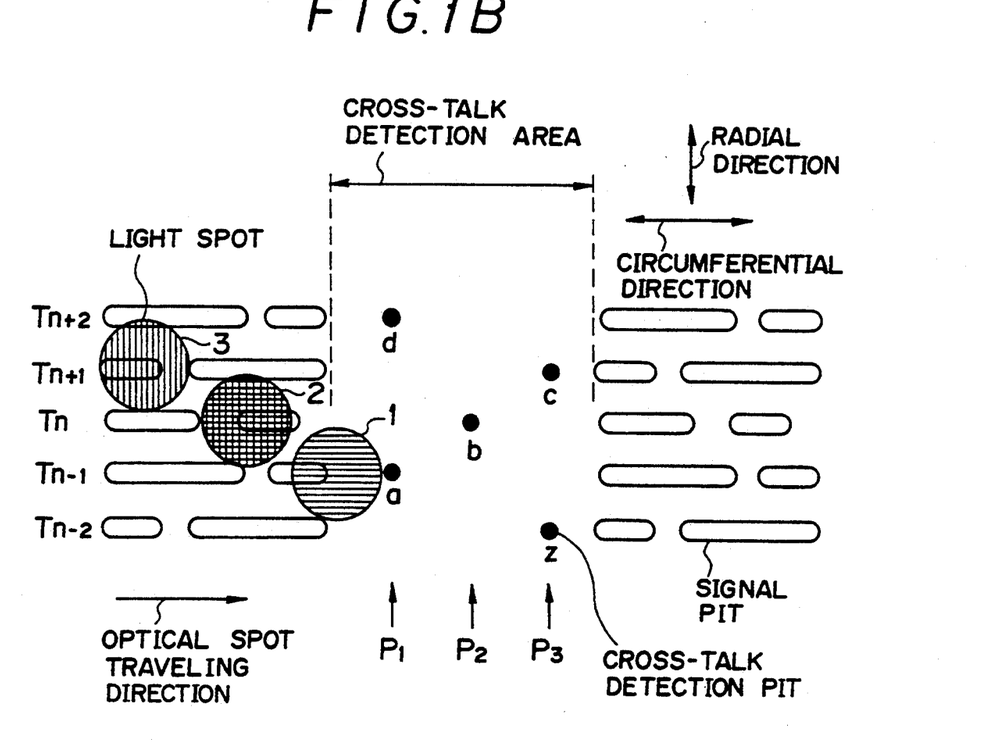

FIGS. 1A and 1B show an overview of an optical disc as one embodiment of the present invention. The optical disc shown in FIG. 1A comprises a plurality of cross-talk detection areas e, e, ..., e respectively provided on signal tracks formed on a signal recording surface.

As shown in FIG. 1B, a plurality of pits a, b, c, d, z for use in cross-talk detection are formed in each of the cross-talk detection areas e, e, ..., e, while no information signal pits are formed in these areas e, e, ... ,e. It is preferable that the cross-talk detection areas be radially arranged at equal intervals of angles and have identical widths. Further, it is preferable that the surfaces of the cross-talk detection areas respectively have mirror-finished planes. Furthermore, it is preferable that the cross-talk detection pits a, b, c, d, z are positioned to be separated from each other on the signal recording surface of the optical disc, so that interference does not occur between the cross-talk detection pits on the adjacent signal tracks when a light spot is projected onto the target signal track to record the information signal.

Figure 2:
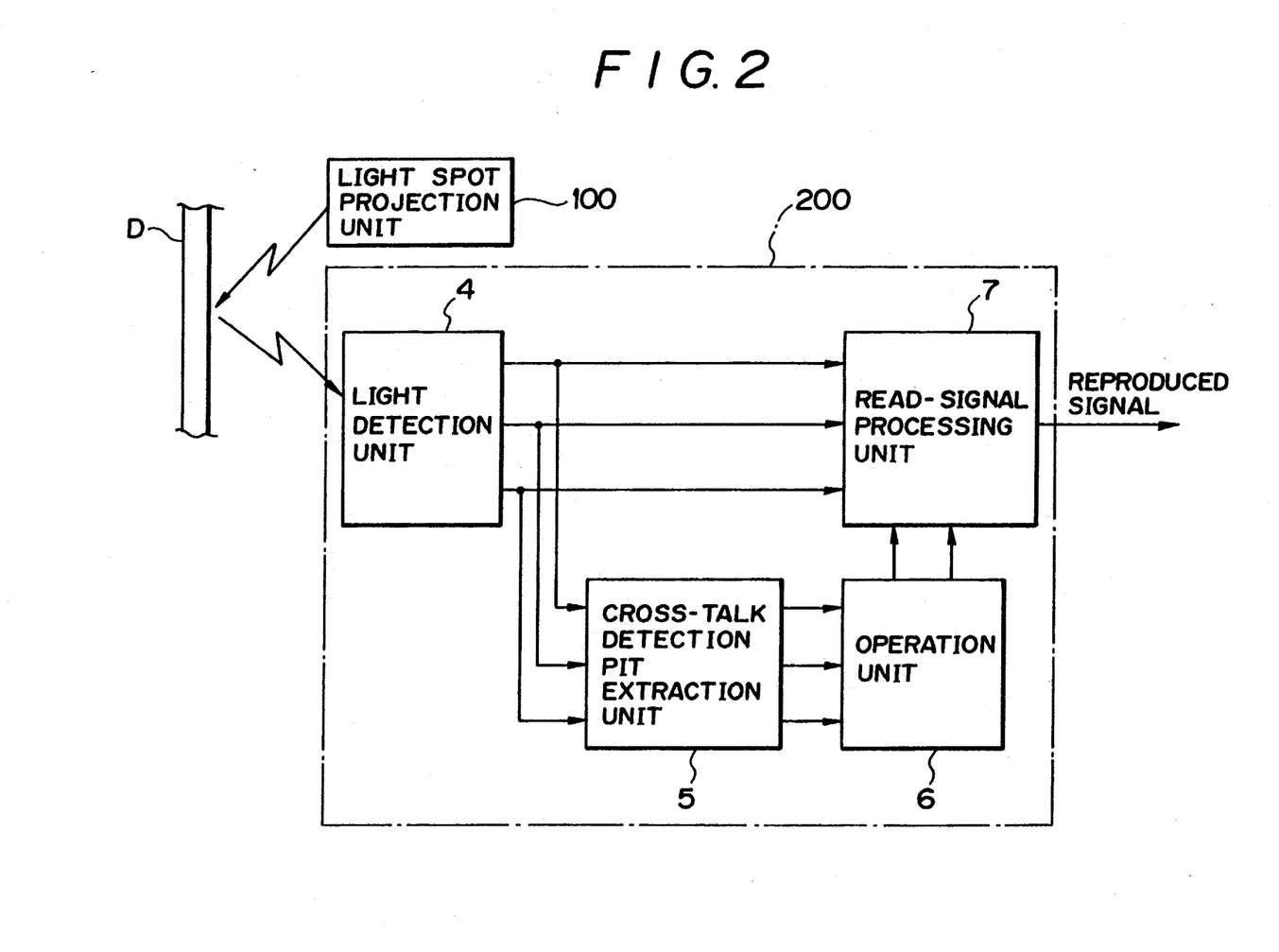
FIG. 2 is a block diagram showing an overview of an apparatus for reproducing signals recorded on the optical disc of FIG. 1, according to an embodiment of the present invention.

FIG. 2 shows an overview of a system for reproducing signals recorded on the optical disc as shown in FIGS. 1A and 1B. The system shown in FIG. 2 comprises a light spot projection unit 100, and a recorded signal reproduction apparatus 200. The reproduction apparatus 200 comprises a light detection unit 4, a cross-talk detection pit extraction unit 5, an operation unit 6, and a read signal processing unit 7.

The light spot projection unit 100 projects, for example, three light spots onto three adjacent signal tracks of the optical disc D, as shown in FIG. 1B. Light beams respectively reflected by the signal tracks are received by the light detection unit 4, which generates corresponding electric signals respectively related to the three adjacent signal tracks. These signals are output to the cross-talk detection pit extraction unit 5 and the read signal processing unit 7. It is also possible for the light spot projection unit 100 to project one light spot on the optical disc, as will be described later. In this case, the light detection unit 4 is equipped with a memory, into which signals read for each signal track are sequentially written. Then, the read signals relating to the target signal track and one or two signal tracks adjacent thereto are read from the memory and then output to the cross-talk detection pit extraction unit 5 and the read signal processing unit 7.

The cross-talk detection areas (e, e, ..., e) are detected by monitoring the read signals, and the read signals of the cross-talk detection pits in the cross-talk detection areas are extracted from the read signals by the cross-talk detection pit extraction unit 5. The read signals of the cross-talk detection pits are output to the operation unit 6, which performs a predetermined operation on these read signals in order to obtain cross-talk canceling coefficients. Then, the operation unit 6 outputs control signals indicating the calculated cross-talk canceling coefficients to the read signal processing unit 7. The read signal processing unit 7 receives the read signal of the adjacent signal tracks and the control signals, and performs a predetermined process for these signals. Then, the read signal processing unit 7 generates a reproduced signal in which cross talk has been eliminated.

For example, when the read signals of the three adjacent signal tracks are processed at one time, the operation unit 6 calculates cross-talk canceling coefficients for attenuating the read signals of the two signal tracks (first and third signal tracks) located on both sides of the center or target signal track (second signal track), or calculates cross-talk canceling coefficients for varying the frequency characteristics of the read signals of the first and third signal tracks. The read signal processing unit 7 subtracts the control signals corresponding to thus calculated cross-talk canceling coefficients from the read signal of the second signal track. In the above manner, the cross talk contained in the read signal of the second track, can be eliminated.

When the read signal of the target signal track receives cross talk from only one side thereof due to the arrangement of the signal tracks, the operation unit 6 calculates a cross-talk canceling coefficient from the read signal of the signal track causing the cross talk. Then, the read signal processing unit 7 subtracts the control signal corresponding to thus calculated cross-talk canceling coefficient from the read signal of the target signal track, so that the cross-talk contained in the read signal of the target track, is eliminated.

In the above-mentioned manner, the cross-talk canceling coefficients are calculated for each of the cross-talk detection areas, and the read signals are corrected using the cross-talk canceling coefficients. Hence, it is possible to rapidly eliminate the cross talk in accordance with a change in the state of the optical disc, such as a warp of the optical disc.

A further description will now be given, with reference to FIGS. 1A and 1B, of a signal recording format of the optical disc according to an embodiment of the present invention. The optical disc shown in FIG. 1A has a plurality of turns of a signal pit string composed of a plurality of pits and spirally arranged on the signal recording surface from the inner portion of the optical disc to the outer portion thereof. A plurality of turns of the signal pit string form a plurality of signal tracks. A plurality of cross-talk detection areas e, e, . . . , e are radially arranged at equal intervals of angles. As shown in FIG. 1B, each of the cross-talk detection areas e, e, . . . , e has a mirror-finished plane, in which cross-talk detection pits z, a, b, c and d are formed on signal tracks $T_{n-2}$, $T_{n-1}$, $T_n$, $T_{n+1}$ and $T_{n+2}$, respectively. As shown in FIG. 1B, adjacent two of the cross-talk detection pits a, b, c, d and z are spaced apart from each other in the circumferential direction in order to prevent a plurality of pits from being concurrently read. For example, as shown in FIG. 1B, three light spots 1, 2 and 3 are projected onto three adjacent signal tracks, and the cross-talk detection pits a, b, c, d and z are arranged so that only one of the cross-talk detection pits a, b, c, d and z is read at one time. The arrangement of the cross-talk detection pits will be described in detail later. It will be noted that the cross-talk detection areas e, e, . . . , e shown in FIG. 1A are emphasized so that they have widths wider than the actual widths thereof. As has been described previously, only cross-talk detection pits a, b, c, d and z are arranged in each of the cross-talk detection areas e, e, . . . , e, and hence the actual widths of the cross-talk detection area including the pits a, b, c, d and z, are extremely narrow. Hence, the cross-talk detection pits a, b, c, d and z do not affect original signals recorded on the signal recording surface other than the cross-talk detection areas.

A description will now be given, with reference to FIG. 3, of a system for reproducing signals recorded on the above-mentioned optical disc, according to a first embodiment of the present invention. A recorded signal reproduction apparatus 200a shown in FIG. 3 receives reflected lights obtained by projecting the three light spots 1, 2 and 3 emitted from a light spot projection unit 10 onto three adjacent signal tracks, and outputs a reproduced signal of the target signal track in which cross-talk signals arising from the two adjacent signal tracks other than the target signal track have been eliminated from the read signal of the target signal track.

The recorded signal reproduction apparatus 200a comprises a light detection unit 4a, a cross-talk detection pit extraction unit 5a, an operation unit 6a, and a read signal processing unit 7a, which units correspond to the light detection unit 4, the cross-talk detection pit extraction unit 5, the operation unit 6, and the read signal processing unit 7 shown in FIG. 2, respectively.

The light detection unit 4a has first, second and third photodetectors 11, 12 and 13. The first photodetector 11 receives a reflected light obtained by projecting the light spot 1 onto the optical disc D, and generates a corresponding electric read signal. The second photodetector 12 receives a reflected light obtained by projecting the light spot onto the optical disc D, and generates a corresponding electric read signal. The third photodetector 13 receives a reflected light obtained by projecting the light spot 3 onto the optical disc D, and generates a corresponding electric read signal.

The cross-talk detection pit extraction unit 5a comprises first, second and third cross-talk detection pit extractors 14, 15 and 16. The first pit extractor 14 monitors an output read signal R1 of the first photodetector 11 to detect the cross-talk detection area, and extracts a read signal of the cross-talk detection pit formed in this area from the above output signal. The second pit extractor 15 monitors an output read signal R2 of the second photodetector 12 to detect the cross-talk detection area, and extracts a read signal of the cross-talk detection pit formed in this area from the above output signal. The third pit extractor 16 monitors an output read signal R3 of the third photodetector 13 to detect the cross-talk detection area, and extracts a read signal of the cross-talk detection pit formed in this area from the above output signal.

The operation unit 6a comprises a first coefficient operation unit 17, and a second coefficient operation unit 18. The first coefficient operation unit 17 performs a predetermined operation on the output signals of the first and second cross-talk detection pit extractors 14 and 15, and generates a control signal based on the result of the predetermined operation. The second coefficient operation unit 18 performs a predetermined operation on the output signals of the second and third cross-talk detection pit extractors 15 and 16, and generates a control signal based on the result of the predetermined operation.

The read signal processing unit 7a comprises a first amplifier 19, a second amplifier 20, and an attenuator 21. The first amplifier 19 attenuates the output signal R1 of the first photodetector 11 in accordance with the control signal output by the first coefficient operation unit 17. The second amplifier 20 attenuates the output signal R3 of the third photodetector 13 in accordance with the control signal output by the second coefficient operation unit 18. The attenuator 21 subtracts the output signals of the first and second amplifiers 19 and 20 from the output signal R2 of the second photodetector 12.

Figures 4A, 4B:
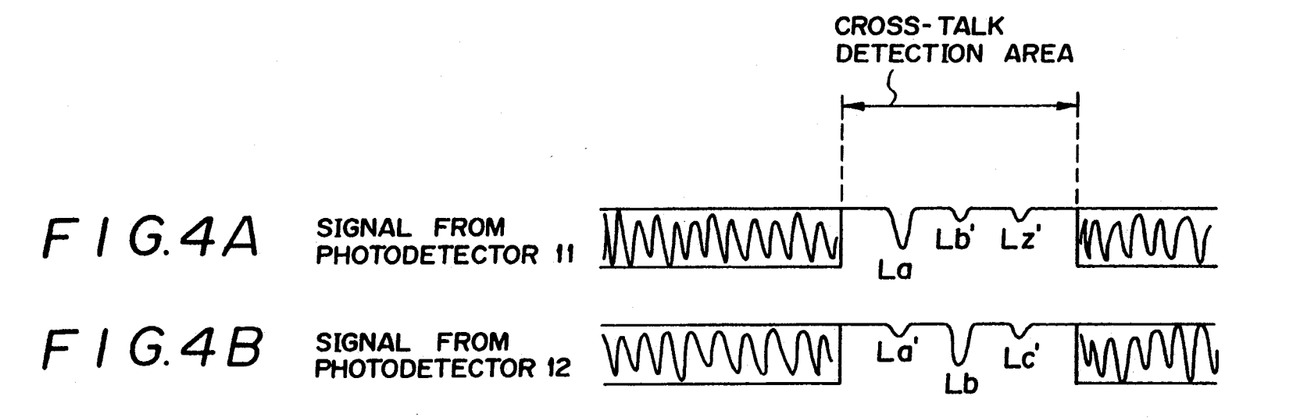
FIGS. 4A, 4B and 4C are waveform diagrams of read signals handled in the reproduction apparatus of FIG. 3.

The output signals R1, R2 and R3 of the photodetectors 11, 12 and 13 respectively obtained when the cross-talk detection pits shown in FIG. 1B are depicted in FIG. 4. More specifically, FIG. 4A shows the output signal R1 of the first photodetector 11 obtained by optically reading the track $T_{n-1}$. In the cross-talk detection area, the waveform of the read signal of the track $T_{n-1}$ has a large peak La, and small peaks Lb' and Lz'. This will be described in more detail by referring to FIG. 1B. When the center of the light spot 1 reaches a position $P_1$ shown in FIG. 1B, the cross-talk detection pit a is read, and the waveform of the read signal of the track $T_{n-1}$ has the large peak La. When the center of the light spot 1 reaches a position $P_2$, the cross-talk detection pit b formed on the track $T_n$ adjacent to the track $T_{n-1}$ is read, and the waveform of the read signal of the track $T_{n-1}$ has the small peak Lb'. When the center of the light spot 1 moves to a position $P_3$, the cross-talk detection pit z formed on the track $T_{n+1}$ adjacent to the track $T_n$ is read, and the waveform of the read signal of the track $T_{n-1}$ has the small peak Lz'. The cross-talk detection pit extractor 14 extracts only the read signal relating to the cross-talk detection area, and outputs it to the coefficient operation unit 17. The cross-talk detection area is designed so that the duration of time during which no signal is continuously available until the peak La of the read signal is obtained is longer than that for the normal recording. The cross-talk detection pit extractor 14 monitors the time duration during which no signal is available in order to detect the cross-talk detection area. The other cross-talk detection pit extractors 15 and 16 operate in the same manner as the cross-talk detection pit extractor 14.

A further description will now be given of the arrangement of the cross-talk detection pits a, b, c, d and z. The cross-talk detection pits b and z are positioned so that the light spot 1 is moving on the position $P_1$ and is reading the cross-talk detection pit a, while the other pits formed on the adjacent signal tracks are not read by the light spot 1. The cross-talk detection pits a and z are positioned so that the light spot 1 is moving on the position $P_2$ and is reading the cross-talk detection pit b, while the other pits formed on the adjacent signal tracks are not read by the light spot 1. The cross-talk detection pits a and b are positioned so that the light spot 1 is moving on the position $P_3$ and is reading the cross-talk detection pit z, while the other pits formed on the adjacent signal tracks are not read by the light spot 1. In the above-mentioned manner, the cross-talk detection pits a, b, c, d and z are positioned so that there is no interference between the cross-talk detection pits formed on the adjacent signal tracks during the read operation.

FIG. 4B shows the output signal R2 of the second photodetector 12 obtained by optically reading the signal track $T_n$ by the light spot 2. When the center of the light spot 2 reaches the position $P_1$ shown in FIG. 1B, the cross-talk detection pit a formed on the signal track $T_{n-1}$ adjacent to the signal track $T_n$ is read, and the waveform of the read signal of the track $T_n$ has a small peak La'. When the center of the light spot 2 reaches the position $P_2$, the cross-talk detection pit b formed on the track $T_n$ is read, and the waveform of the read signal of the track $T_n$ has a large peak Lb. When the center of the light spot 2 moves to the position $P_3$, the cross-talk detection pit c formed on the track $T_{n+1}$ adjacent to the track $T_n$ is read, and the waveform of the read signal of the track $T_n$ has a small peak Lc'.

Figure 4C:
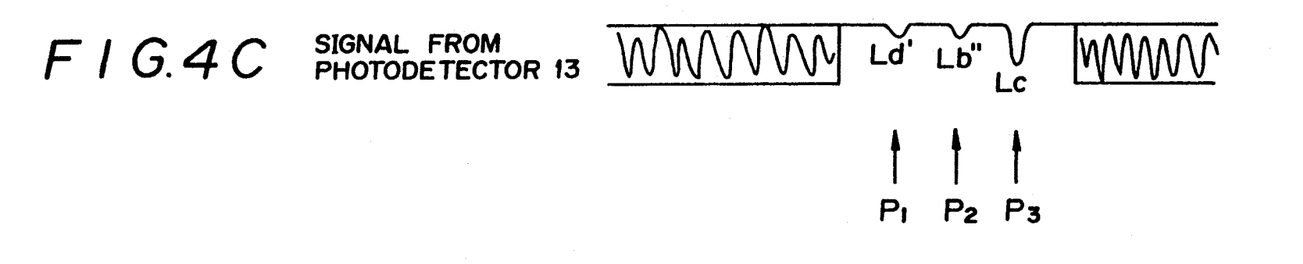

FIG. 4C shows the output signal of the third photodetector 13 obtained by optically reading the signal track $T_{n+1}$ by the light spot 3. When the center of the light spot 3 reaches the position $P_1$ shown in FIG. 1B, the cross-talk detection pit d formed on the signal track $T_{n+2}$ adjacent to the signal track $T_{n+1}$ is read, and the waveform of the read signal of the track $T_{n+1}$ has a small peak Ld'. When the center of the light spot 3 reaches the position $P_2$, the cross-talk detection pit b formed on the track $T_n$ is read, and the read signal of the track $T_{n+1}$ has a small peak Lb''. When the center of the light spot 3 moves to the position $P_3$, the cross-talk detection pit c formed on the track $T_{n+1}$ is read, and the read signal of the track $T_{n+1}$ has a large peak Lc.

The read signal obtained by projecting the light spot 2 (in FIG. 1B) onto the signal track $T_n$ contains a cross talk having the level La' due to the cross-talk detection pit a formed on the adjacent signal track $T_{n-1}$ and cross talk having the level Lc' due to the cross-talk detection pit c on the adjacent signal track $T_{n+1}$ as shown in FIG. 4B. Hence, the cross-talk canceling coefficient for canceling a cross talk from the adjacent signal track onto which the light spot 1 is projected can be obtained from the ratio of the signal levels La and La'. Similarly, the cross-talk canceling coefficient for canceling the cross talk from the adjacent signal track onto which the light spot 3 is projected can be obtained from the ratio of the signal levels Lc and Lc'. A reproduced signal S2 of the signal track $T_n$ which does not contain cross talk can be obtained as follows:

$$S2 = R2 - (La'/La)R1 - (Lc'/Lc)R3$$

where R1 denotes the read signal output from the first photodetector 11, R2 denotes the read signal output from the second photodetector 12, and R3 denotes the read signal output from the third photodetector 13.

Figure 3:
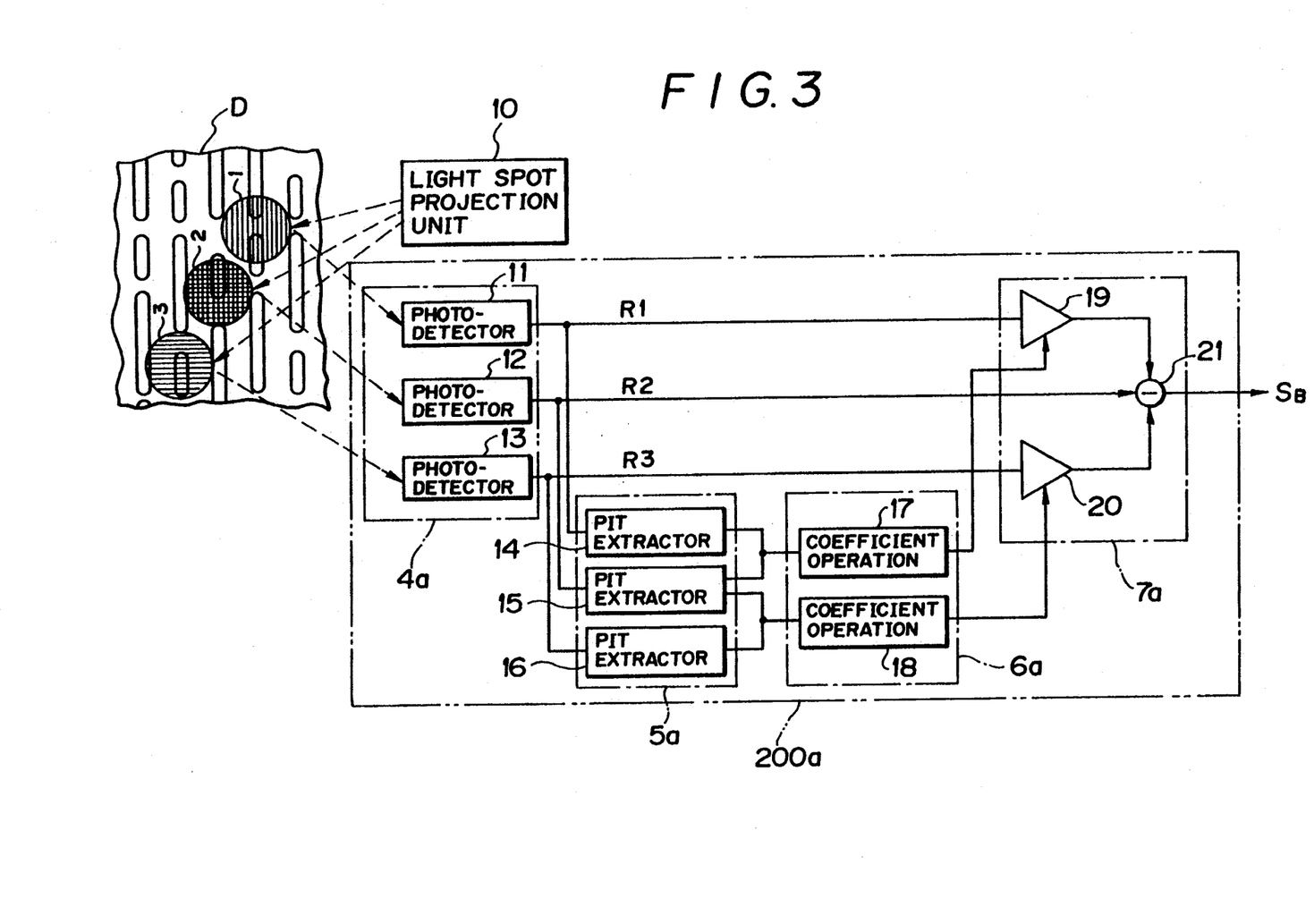
FIG. 3 is a block diagram of a recorded signal reproduction apparatus according to a first embodiment of the present invention.

The coefficient operation unit 17 shown in FIG. 3 picks up the signal levels La' and La of the output signals of the cross-talk detection pit extractors 14 and 15. That is, the coefficient operation unit 17 latches the peak levels of the read signals obtained by means of the light spots 1 and 2 incident to the cross-talk detection pit a formed on the signal track $T_{n-1}$. Then, the coefficient operation unit 17 calculates the ratio of the peak levels La' and La (La'/La), and generates the control signal corresponding to the ratio La'/La. The coefficient operation unit 18 picks up the signal levels Lc' and Lc of the output signals of the cross-talk detection pit extractors 15 and 16. That is, the coefficient operation unit 18 latches the peak levels of the read signals obtained by means of the light spots 2 and 3 incident to the cross-talk detection pit c formed on the signal track $T_{n+1}$. Then, the coefficient operation unit 18 calculates the ratio of the peak levels Lc' and Lc (Lc'/Lc), and generates the control signal corresponding to the ratio Lc'/Lc.

The amplifier 19 attenuates the read signal R1 output from the first photodetector 11 in accordance with the control signal from the coefficient operation unit 17, and generates a cross-talk canceling signal. The amplifier 20 attenuates the read signal R3 output from the third photodetector 13 in accordance with the control signal from the coefficient operation unit 18, and generates a cross-talk canceling signal. The subtracter 21 subtracts the cross-talk canceling signals from the amplifiers 19 and 20 from the read signal R2 output by the second photodetector 12, so that the reproduced signal S2 from which cross talk has been eliminated is obtained.

The coefficient operation units 17 and 18 continuously maintain the respective control signals until the next cross-talk detection area is processed. That is, the cross-talk canceling coefficients obtained in the above-mentioned manner are used for canceling the cross-talk until the next cross-talk detection area is obtained. In other words, the cross-talk canceling coefficients are updated for each cross-talk detection area. Hence, it is possible to cancel cross talk, rapidly following changes in the state of the optical disc.

Figure 5:
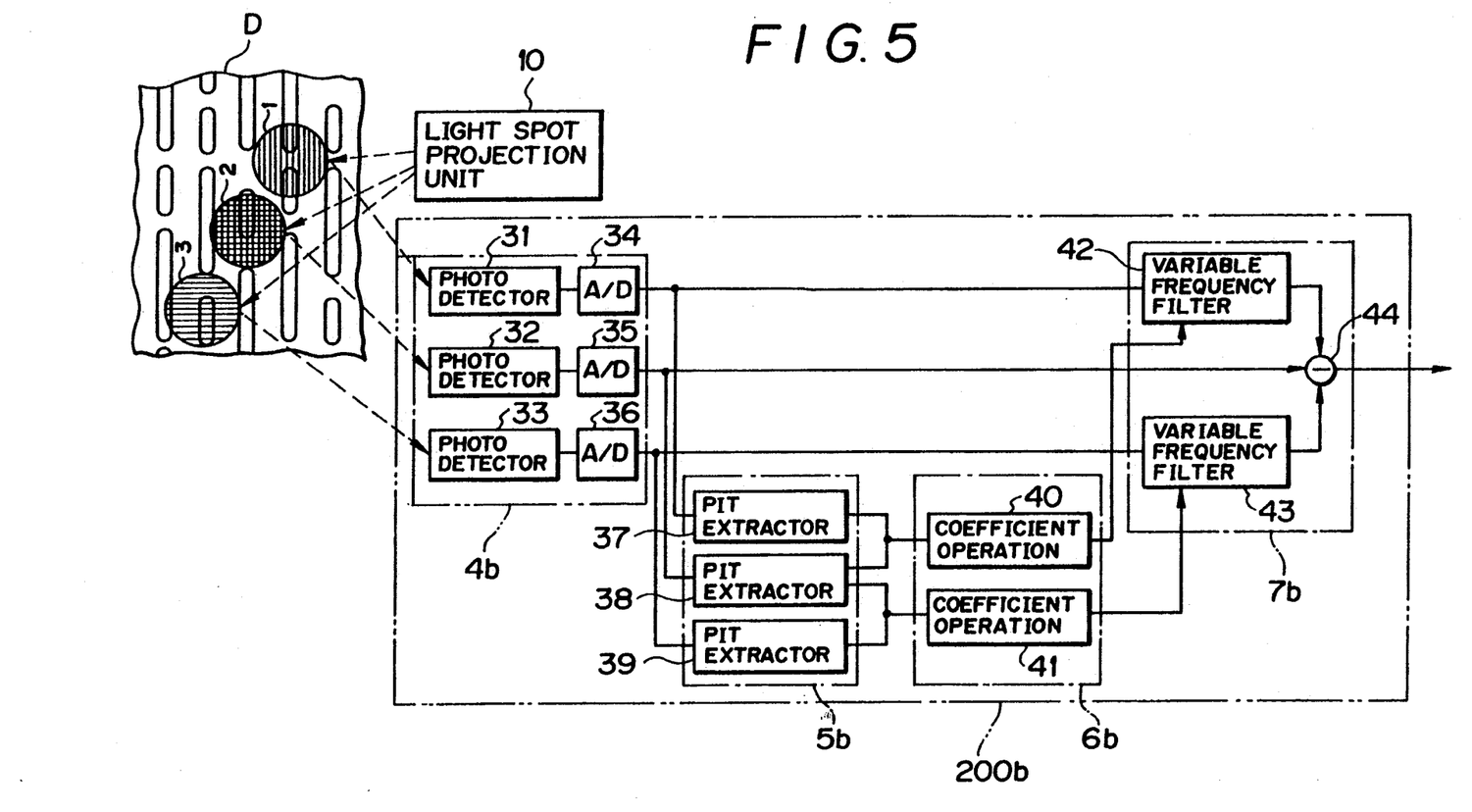
FIG. 5 is a block diagram of a recorded signal reproduction apparatus according to a second embodiment of the present invention.

A description will now be given, with reference to FIG. 5, of a system for reproducing signals recorded on the aforementioned optical disc, according to a second embodiment of the present invention. As shown in FIG. 5, three light spots 1, 2 and 3 emitted from the light spot projection unit 10 are projected onto three adjacent signal tracks as in the case of the first embodiment of the present invention in FIG. 3. A recorded signal reproduction apparatus 200b receives reflected lights obtained by projecting the light spots 1, 2 and 3 onto the signal tracks, and generates a reproduced signal of the target signal track from which cross-talk signals from the two adjacent signal tracks have been eliminated.

The aforementioned first embodiment of the present invention is capable of effectively canceling a cross talk in a case where the frequency characteristic of the reproduced signal substantially coincides with the frequency characteristic of the cross-talk signal. However, in actuality, it sometimes happens that the frequency characteristics of the reproduced signal and cross-talk signal are different from each other. With the above in mind, the second embodiment of the present invention is intended to cancel cross talk even when the frequency characteristics of the reproduced signal and cross-talk signal do not coincide with each other.

As shown in FIG. 5, the recorded signal reproduction apparatus 200b comprises a light detection unit 4b, a cross-talk detection pit extraction unit 5b, an operation unit 6b, and a read signal processing unit 7b. The light detection unit 4b comprises first, second and third photodetectors 31, 32 and 33, and A/D converters 34, 35 and 36. The first photodetector 31 receives a reflected light obtained by projecting the optical spot 1 onto the optical disc D, and generates a corresponding electric read signal. The second photodetector 32 receives a reflected light obtained by projecting the light spot 2 onto the optical disc D, and generates a corresponding electric read signal. The third photodetector 33 receives a reflected light obtained by projecting the light spot 3 onto the optical disc, and generates a corresponding electric read signal. The A/D converter 34 converts the output signal of the photodetector 31 into a corresponding digital signal. The A/D converter 35 converts the output signal of the photodetector 32 into a corresponding digital signal. The A/D converter 36 converts the output signal of the photodetector 33 into a corresponding digital signal. The cross-talk detection pit extraction unit 5b comprises first, second and third pit extractors 37, 38 and 39.

The first pit extractor 37 monitors the output signal of the A/D converter 34 to detect the cross-talk detection area, and extracts a read signal of the cross-talk detection pit formed in this area from the above output signal. The second pit extractor 38 monitors the output signal of the A/D converter 35 to detect the cross-talk detection area, and extracts a read signal of the cross-talk detection pit formed in this area from the above output signal. The third pit extractor 39 monitors the output signal of the A/D converter 36 to detect the cross-talk detection area, and extracts a read signal of the cross-talk detection pit formed in this area from the above output signal.

The operation unit 6b comprises a first coefficient operation unit 40, and a second coefficient operation unit 41. The first coefficient operation unit 40 performs a predetermined operation on the output signals of the first and second cross-talk detection pit extractors 37 and 38, and generates a control signal based on the result of the predetermined operation. The second coefficient operation unit 41 performs a predetermined operation on the output signals of the second and third cross-talk detection pit extractors 38 and 39, and generates a control signal based on the result of the predetermined operation.

The read signal processing unit 7b comprises first and second variable frequency filters 42 and 43, and a subtracter 44. The first variable frequency filter 42 changes the frequency characteristic of the output signal of the A/D converter 34 in accordance with the control signal generated by the first coefficient operation unit 40. The second variable frequency filter 43 changes the frequency characteristic of the output signal of the A/D converter 36 in accordance with the control signal generated by the second coefficient operation unit 41. The subtracter 44 subtracts output signals of the first and second variable frequency filters 42 and 43 from the output signal of the A/D converter 35.

Figure 6A:
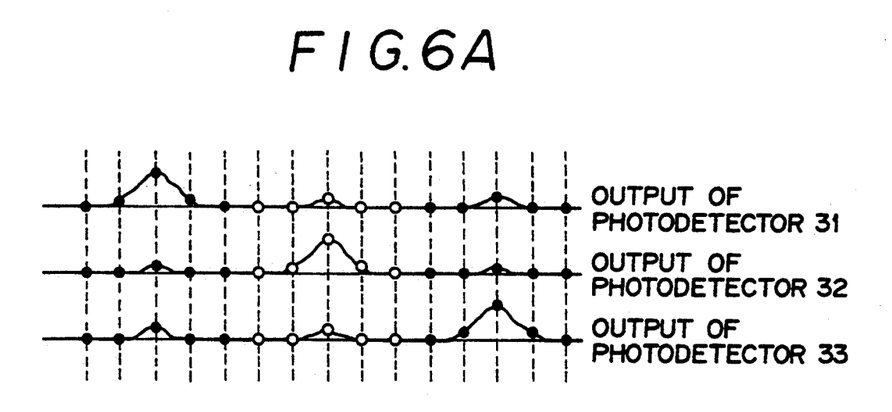
FIG. 6A is a waveform diagram of read signals handled in the reproduction apparatus of FIG. 5.

FIG. 6A shows examples of the output signals of the photodetectors 31, 32 and 33 obtained when the cross-talk detection pits a, b, c, d and z recorded on the optical disc shown in FIG. 1B are read. The output signals of the photodetectors 31, 32 and 33 are respectively digitized by the A/D converters 34, 35 and 36 with a predetermined sampling frequency. The cross-talk detection pit extractors 37, 38 and 39 respectively monitor the output signals of the A/D converters 34, 35 and 36, and detect the cross-talk detection areas in the same manner as in the case of the first embodiment of the present invention. Then, the cross-talk detection pit extractors 37, 38 and 39 respectively generate the signals of the cross-talk detection pits in each of the cross-talk detection areas.

Figure 6B:
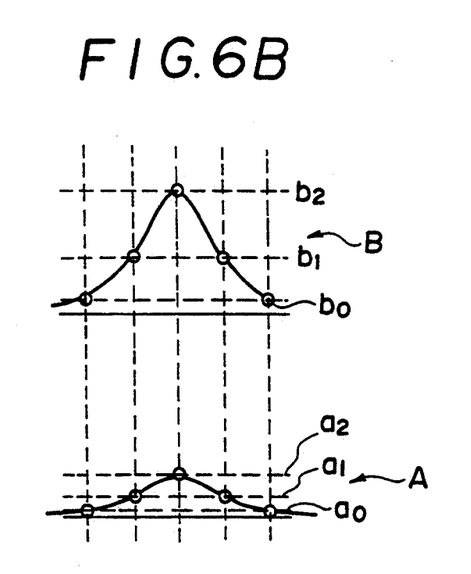
FIG. 6B is a waveform diagram showing how extracted data indicate the levels of the read signals in the reproduction apparatus of FIG. 5.

As shown in FIG. 6B, each of the signals extracted by the cross-talk detection pit extractors 37, 38 and 39 is sampled at predetermined time intervals around its peak. Then, three signal levels obtained at three sampling points including the signal peak are detected and output by each of the extractors 37, 38 and 39. It is determined, based on the peak level of each extracted signal, whether each of the read signals output by the photodetectors 31, 32 and 33 is a read signal of the cross-talk detection pit on the target signal track onto which the light spot is projected, or a read signal of the cross-talk detection pit on a signal track adjacent to the target signal track. When it is determined that the read signal being processed comes from the cross-talk detection pit on the target signal track, the read signal is handled as an impulse signal. When it is determined that the read signal being processed corresponds to the read signal of the cross-talk detection pit on a signal track adjacent to the target signal track, the read signal is handled as a cross-talk signal. Then, as shown in FIG. 6B, each of the extractors 37, 38 and 39 outputs, to either the coefficient operation unit 40 or 41, a group of three levels $b_0$, $b_1$ and $b_2$ of the impulse signal, or a group of three levels $a_0$, $a_1$ and $a_2$ of the cross-talk signal separately from each other.

FIG. 6B shows a signal B obtained by reading a pit formed on the adjacent signal track by the light spot projected onto the above adjacent signal track. FIG. 6B also shows a signal A obtained by reading the above pit formed on the adjacent signal track by the light spot projected onto the target signal track next to the adjacent signal track. That is, the signal A is a cross talk from the adjacent signal track to the target signal track. Using the Z transform generally used in digital signal processing, the signal A can be described as expression (1), and the signal B can be described as expression (2):

$$A: H(z)K(z)\delta = a_0 + a_1 z^{-1} + a_2 z^{-2} + a_1 z^{-3} + a_0 z^{-4} \qquad (1)$$

$$B: K(z)\delta = b_0 + b_1 z^{-1} + b_2 z^{-2} + b_1 z^{-3} + b_0 z^{-4} \qquad (2)$$

where K(z) denotes an impulse response function of the reproduction system, H(z) denotes a cross-talk function, and $\delta$ denotes a $\delta$ function i.e. a function which value becomes 1 when it is z-transformed.

Thus, the following expression (3) is obtained:

$$H(Z) = \frac{H(z) \cdot K(z) \cdot \delta}{K(z) \cdot \delta} = \frac{a_0 + a_1 z^{-1} + a_2 z^{-2} + a_1 z^{-3} + a_0 z^{-4}}{b_0 + b_1 z^{-1} + b_2 z^{-2} + b_1 z^{-3} + b_0 z^{-4}}$$

The above H(z) is a function which converts the signal reproduced from the adjacent signal track into a signal corresponding to a cross talk contained in the signal reproduced from the target signal track. Hence, a signal P(n) from the target track obtained after the cross talk has been eliminated is written as follows:

$$P(n) = A(n) - y(n) \quad (4)$$

where A(n) denotes a reproduced signal obtained by sampling a signal reproduced from the target track, B(n) denotes a signal obtained by sampling a signal reproduced from the adjacent track, and y(n) denotes a signal obtained by converting the signal reproduced from the adjacent signal track into a signal corresponding to a cross talk on the target signal track. The function y(n) is described as follows:

$$y(n) = (a_0/b_0)B(n) + (a_1/b_0)B(n-1) + \quad (5)$$
$$(a_2/b_0)B(n-2) + (a_1/b_0)B(n-3) +$$
$$(a_0/b_0)B(n-4) - (b_1/b_0)y(n-1) -$$
$$(b_2/b_0)y(n-2) - (b_1/b_0)y(n-3) - y(n-4).$$

The above function y(n) is obtained as follows. Assuming that the z transform of y(n) is denoted as Y(z) and the z transform of B(n) is denoted as B(z), the following is obtained:

$$Y(z) = H(z) \cdot B(z).$$

Thus, Y(z) is rewritten as follows:

$$Y(z)(b_0 + b_1 z^{-1} + b_2 z^{-2} + b_1 z^{-3} + b_0 z^{-4})$$
$$= (a_0 + a_1 z^{-1} + a_2 z^{-2} + a_1 z^{-3} + a_0 z^{-4})B(z).$$

By using the reverse z transform, the above is rewritten as follows:

$$b_0 y(n) + b_1 y(n-1) + b_2 y(n-2) + b_1 y(n-3) + b_0 y(n-4)$$
$$= a_0 B(n) + a_1 B(n-2) + a_2 B(n-2) + a_1 B(n-3) + a_0 B(n-4).$$

From the above expression, y(n) is obtained as indicated by the expression (5).

The first coefficient operation unit 40 in FIG. 5, receives data indicating the levels of the extracted signals from the cross-talk detection pit extractors 37 and 38, and calculates the coefficients from $(a_0/b_0)$ to $(b_1/b_0)$ in the expression (5). Then, the first coefficient operation unit 40 outputs the control signal based on the result of the above coefficient operation to the variable frequency filter 42. The second coefficient operation unit 41 receives data indicating the levels of the extracted signals from the cross-talk detection pit extractors 38 and 39, and calculates the coefficients from $(a_0/b_0)$ to $(b_1/b_0)$ in the expression (5). Then, the second coefficient operation unit 41 outputs the control signal based on the result of the above coefficient operation to the variable frequency filter 43. The control signals of the variable frequency filters 42 and 43 are calculated and updated for each of the cross-talk detection areas. The first and second coefficient operation units 40 and 41 can be formed with, for example, digital signal processors (DSPs), which is capable of performing digital signal processing at high speed.

The variable frequency filter 42 changes the frequency characteristic of the digital read signal output from the A/D converter 34 in accordance with the control signal generated by the coefficient operation unit 40. The variable frequency filter 43 changes the frequency characteristic of the digital read signal from the A/D converter 36 in accordance with the control signal generated by the coefficient operation unit 41.

The subtracter 44 subtracts the output signals of the variable frequency filters 42 and 43 from the digital read signal output from the A/D converter 35. Then, the subtracter 44 outputs the signal reproduced from the target signal track in which the cross talk from the adjacent signal tracks has been eliminated.

According to the second embodiment of the present invention, it is possible to generate, from the signals from the signal tracks adjacent to the target signal track, signals having the same levels as the cross-talk signals contained in the signal reproduced from the target signal track and having the same frequency characteristics as the above cross-talk signals contained therein. Hence, even when the frequency characteristic of the reproduced signal does not coincide with that of the cross-talk signal, it is possible to generate the reproduced original signal in which the cross-talk signals has been eliminated.

The variable frequency filters 42 and 43 can be formed with FIR (Finite Impulse Response) filters. In this case, it is possible to determine the filter coefficients of the FIR filters by means of the coefficient operation units 40 and 41. A series h(k) of coefficients of each FIR filter can be obtained from the following equation:

$$b(n) = h(k) * a(n)$$

where a(n) denotes a series of samples of the signal A, b(n) denotes a series of samples of the signal B, and symbol * denotes a convolutional operation. By obtaining the above h(k) satisfying the above equation, it is possible to obtain a function for converting the signals reproduced from the adjacent signal tracks into signals corresponding to cross-talk signals contained in the signal reproduced from the target signal track. The function h(k) can be easily obtained in a conventional method (see, for example, "Grounding in Digital Signal Processing", Chapter VI "Adaptive Signal Processing", The Institute of Electronics, Information and Communication Engineers).

The signal y(n) corresponding to the cross-talk signal contained in the signal reproduced from the target signal track can be obtained by performing the following convolutional operation on the signal B(n) reproduced from the adjacent signal track and h(k):

$$y(n) = h(k) * B(n)$$
$$= h(o)B(n) + h(1)B(n-1) + \ldots$$

The reproduced signal P(n) obtained after the cross-talk signal has been canceled is obtained as follows:

$$P(n) = A(n) - y(n)$$

where A(n) denotes the sampled signals reproduced from the target signal track.

Figure 7:
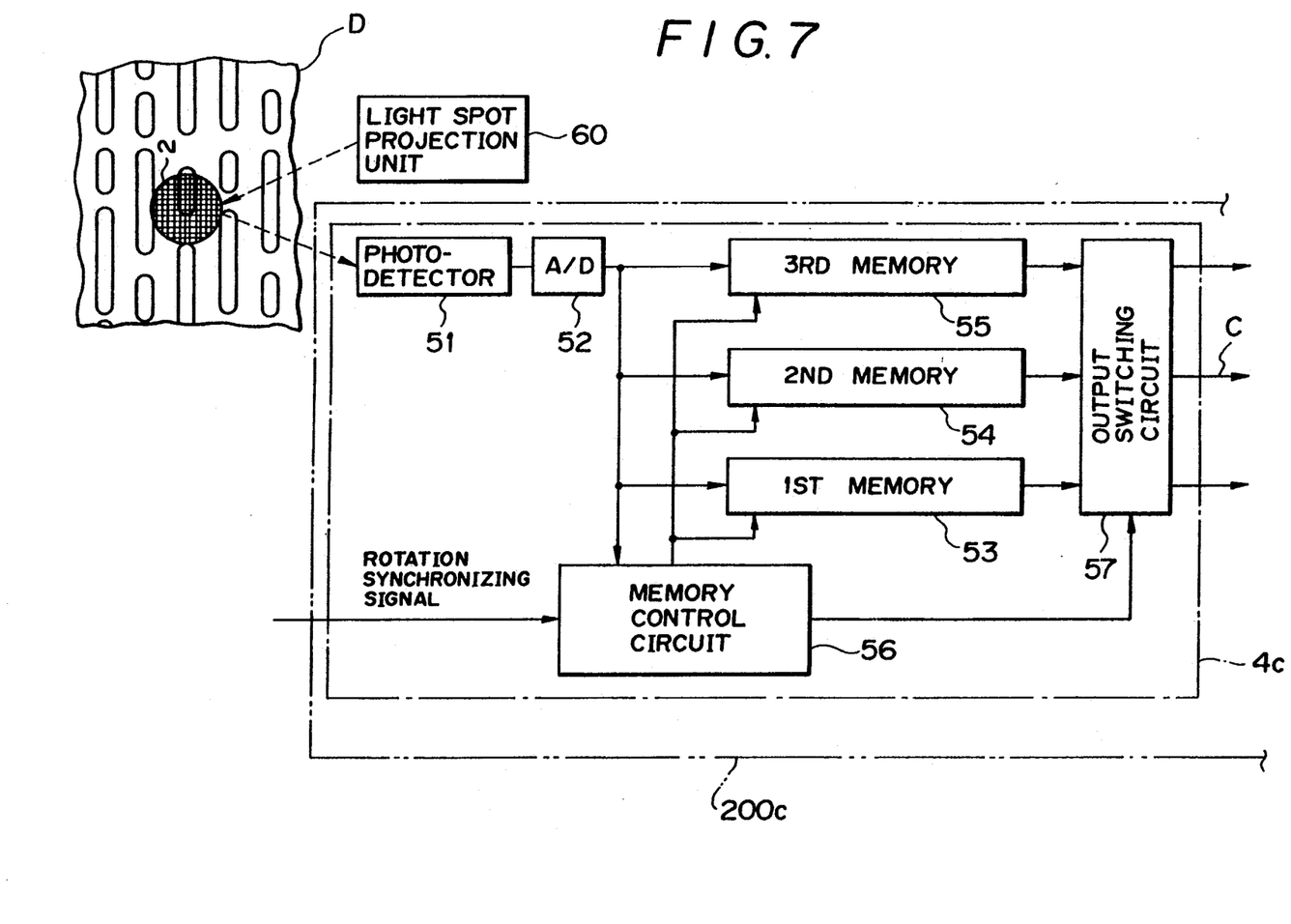
FIG. 7 is a block diagram of a light detection unit in a recorded signal reproduction apparatus according to a third embodiment of the present invention.

A description will now be given, with reference to FIG. 7, of a system for reproducing signals recorded on the optical disc according to a third embodiment of the present invention. The third embodiment of the present invention is different from the aforementioned first and second embodiments, in that as shown in FIG. 7, only the light spot 2 emitted from a light spot projection unit 60 is projected onto the signal recording surface of the optical disc D. A light reflected by the optical disc D is converted into an electric signal, from which cross-talk signals from the adjacent signal tracks is eliminated. In order to simultaneously process signals read from a plurality of signal tracks, the third embodiment of the present invention employs a structure in which the read signals from the signal tracks are temporarily stored and output at the same time.

Referring to FIG. 7, a recorded signal reproduction apparatus 200c comprises a light detection unit 4c, which comprises a photodetector 51, and A/D converter 52, first, second and third memories 53, 54 and 55, a memory control circuit 56, and an output switching circuit 57. The photodetector 51 receives a reflected light from the optical disc D, and generates a corresponding electric signal. The A/D converter 52 converts the analogue electric signal from the photodetector 51 into a corresponding electric signal in digital form. Each of the memories 53, 54 and 55 has a storage capacity corresponding to one signal track. The memory control circuit 56 receives a rotation synchronizing signal for controlling the rotation of the optical disc D, and controls write and read operations of the memories 53, 54 and 55. The rotation synchronizing signal is a pulse signal generated each time the optical disc D makes one revolution. The output switching circuit 57 selects one of the memories 53, 54 and 55 in response to an instruction signal generated by the memory control circuit 56.

The memory control circuit 56 sequentially selects one of the memories 53, 54 and 55 each time the rotation synchronizing signal is generated, that is, each time the reading of one signal track is completed, and hence the digital read signal is written into the selected memory. For example, the write operations of the memories 53, 54 and 55 are controlled by the memory control circuit 56 as follows. In response to the rotation synchronizing signal, the memory control circuit 56 outputs an address signal to the first memory 53 so that the output signal of the A/D converter 52 is sequentially written into the first memory 53 from the beginning address. In response to the next (second) pulse of the rotation synchronizing signal, the memory control circuit 56 outputs an address signal to the second memory 54 so that the output signal of the A/D converter 52 is sequentially written into the second memory 54 from the beginning address. In response to the third pulse of the rotation synchronizing signal, the memory control circuit 56 outputs an address signal to the third memory 55 so that the output signal of the A/D converter 52 is sequentially written into the third memory 55 from the beginning address. In response to the fourth pulse of the rotation synchronizing signal, the memory control circuit 56 outputs the address signal to the first memory circuit 53. In this manner, the controller 56 sequentially selects one of the memories 53, 54 and 55 each time the reading of one signal track is completed. Hence, the read signals relating to three signal tracks are always stored in the memories 53, 54 and 55.

Figure 8:
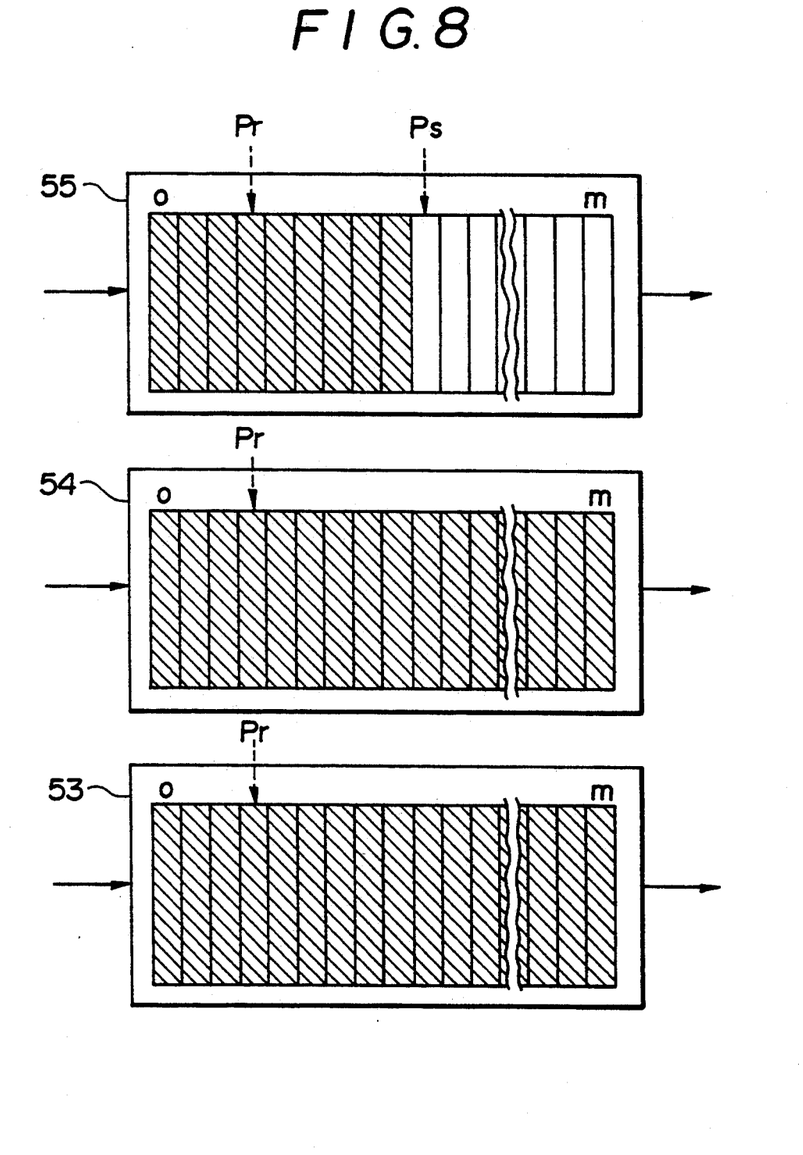
FIG. 8 is a diagram showing how data is written into memories and read therefrom in the reproduction apparatus of FIG. 7.

FIG. 8 shows how data is written into the memories 53, 54 and 55 and how data is read therefrom. In FIG. 8, hatched areas are storage areas in which data has been stored. Ps indicates a storage pointer, and Pr indicates a read pointer. The read signal of the first signal track is written into storage areas of the first memory 53 having addresses of 0 to m, and the read signal of the second signal track adjacent to the first signal track is written into storage areas of the second memory 54 having addresses of 0 to m. The read signal of the third signal tracks adjacent to the second signal track is written into storage areas of the third memory 55 respectively having addresses between address 0 and an address immediately prior to the address indicated by the storage pointer Ps. The read signal is written into storage areas of the third memory 55 from the address indicated by the storage pointer Ps.

In FIG. 7, the memory control circuit 56 controls the memories 53, 54 and 55 so that the read signals from the A/D converter 52 are read therefrom while the read signals are simultaneously written therein. For example, the read operations of the memories 53, 54 and 55 are carried out as follows. When the writing of the read signals into the first and second memories 53 and 54 has been completed, a control is executed in which the reading of the signals stored in the first and second memories 53 and 54 starts from the beginning address by supplying the same address (which is indicated by the pointer Pr) to the memories 53 and 54 immediately after the writing of the read signal into the third memory 55 starts. When the writing of the read signals is switched from the third memory 55 to the first memory 53, the reading of the signals stored in the areas of the address 0 to the address m is carried out. Subsequently, the reading operations of the memories 53, 54 and 55 are repeatedly carried out from the beginning addresses thereof.

In the above-mentioned manner, the read signals from the A/D converter 52 are temporarily stored in the memories 53, 54 and 55 and then read therefrom. When the read signal of the first signal track among the three adjacent tracks is written into the first memory 53, the read signal of the second signal track is written into the second memory 54, and the read signal of the third signal track is started to be written into the third memory 55, the read signals stored in these memories are read out therefrom as if these read signals are simultaneously read. In this case, the read signal from the center signal track interposed between two adjacent signal tracks is the output signal of the second memory 54. When a read signal from the fourth signal track which is read immediately after the third signal track is stored in the first memory 53, the read signal of the center signal track is the output signal of the third memory 55. With the above in mind, the memory control circuit 56 controls the output control circuit 57 so that the read signal of the center signal track is placed at an output C shown in FIG. 7.

Hence, by processing the output signal of the light detection unit 4c in the same manner as in the case of the first or second embodiment of the present invention, it is possible to generate the reproduced signal in which the cross-talk signals from the adjacent signals have been eliminated. When the analog process for canceling cross talk in the first embodiment of the present invention is employed, D/A converters are connected to the output side of the light detection unit 4c.

It will be noted that the third embodiment of the present invention is achieved by an optical system simpler than the optical systems of the first and second embodiments thereof since the third embodiment uses only one light spot. In general, it is difficult to precisely adjust the optical systems to obtain a desirable state.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc comprising:
    a signal track formed on a signal recording surface of said optical disc; and
    a plurality of cross-talk detection areas each formed on a portion of said signal track and including pits for detecting a cross-talk, signals being recorded on areas of said signal track other than said cross-talk detection areas.

2. An optical disc as claimed in claim 1, wherein:
    said cross-talk detection areas are radially formed on said signal recording surface and are spaced apart from each other at predetermined intervals of angles; and
    said cross-talk detection areas have identical widths.

3. An optical disc as claimed in claim 1, wherein said cross-talk detection areas respectively have mirror-finished surfaces.

4. An optical disc as claimed in claim 1, wherein said pits for detecting the cross-talk in each of said cross-talk detection areas, are positioned to be spaced apart from each other so that the pits formed on adjacent signal tracks do not interfere with each other during a read operation in which said pits for detecting the cross-talk are optically read.

5. An apparatus for reproducing signals recorded on an optical disc, which comprises a signal track formed on a signal recording surface of said optical disc, and a plurality of cross-talk detection areas each formed on a portion of said signal track and including pits for detecting a cross-talk, signals being recorded on areas of said signal track other than said cross-talk detection areas, by detecting a light reflected from said optical disc to which at least one light spot is projected, said apparatus comprising:
    a light detection means for receiving the reflected light and for generating read signals of a plurality of adjacent signal tracks of said optical disk;
    a cross-talk detection pit extracting means, coupled to said light detection means, for detecting the cross-talk detection areas from the read signals, and for extracting, from the read signals, signal components of said pits for detecting the cross-talk with respect to each signal track;
    an operation means, coupled to said cross-talk detection pit extracting means, for performing a predetermined operation on the extracted signal components, and for generating a control signal based on a result of said predetermined operation; and
    a read signal processing means, coupled to said light detection means and said operation means, for receiving the read signals and the control signal and for deriving, from the read signals and the control signal, a reproduced signal in which the cross-talk is eliminated.

6. An apparatus as claimed in claim 5, wherein said read signal processing means is adapted to attenuate amplitudes of the read signals other than the read signal of a target signal track on the basis of the control signal, and to subtract the attenuated read signals from the read signal of the target signal track.

7. An apparatus as claimed in claim 5, wherein said read signal processing means is adapted to vary frequency characteristics of the read signals other than the read signal of a target signal track on the basis of the control signal, and to subtract the read signals having varied frequency characteristics from the read signal of the target signal track.

8. An apparatus as claimed in claim 5, wherein said light detection means comprises:
    a photodetector for receiving the reflected light and for outputting the read signal related to each signal track;
    an A/D converter for converting the read signal into a digital read signal;
    first, second and third memories for storing the digital read signal related to each signal track respectively;
    a memory control means, coupled to said first, second and third memories, for controlling, in synchronism with a rotation synchronizing signal related to a rotation of said optical disc and supplied from an external device, writing operation of the digital read signals into said first, second and third memories and reading operation of the digital read signals from said first, second and third memories; and
    an output control means, coupled to said first, second and third memories, for selectively outputting one of the digital read signals read from said first, second and third memories.

9. An apparatus as claimed in claim 8, wherein said memory control means is adapted to sequentially select one of said first, second and third memories in response to the rotation synchronizing signal so that the digital read signal from said A/D converter is written into a selected one of said first, second and third memories while the digital read signals are concurrently read from said first, second and third memories.

10. An apparatus as claimed in claim 5, wherein:
    said light detection means receives the reflected light from three adjacent signal tracks of said optical disk, and generates read signals of the three adjacent signal tracks; and
    said read signal processing means derives, from the read signals and the control signal, a reproduced signal of a center signal track which is one of the three adjacent signal tracks and interposed between two remaining signal tracks, said reproduced signal being a signal obtained by eliminating, from the read signal of the center signal track, cross-talks from the two remaining signal tracks.

11. An apparatus as claimed in claim 10, wherein said read signal processing means is adapted to attenuate amplitudes of the read signals of the two remaining signal tracks on the basis of the control signal and to subtract the attenuated read signals from the read signal of the center signal track.

12. An apparatus as claimed in claim 10, wherein said read signal processing means is adapted to vary frequency characteristics of the read signals of the two remaining signal tracks on the basis of the control signal and to subtract the read signals having varied frequency characteristics from the read signal of the center signal track.

13. An apparatus for reproducing signals recorded on an optical disc, which comprises a signal track formed on a signal recording surface of said optical disc, and a plurality of cross-talk detection areas each formed on a portion of said signal track and including pits for detecting a cross-talk, signals being recorded on areas of said signal track other than said cross-talk detection areas, by detecting each light reflected from said optical disc to which first, second and third light spots are respectively projected onto three adjacent signal tracks of said optical disk, said apparatus comprising:

a first photodetector for receiving the reflected light of the first light spot and for generating a first read signal;

a second photodetector for receiving the reflected light of the second light spot and for generating a second read signal;

a third photodetector for receiving the reflected light of the third light spot and for generating a third read signal;

a first extractor for generating, from the first read signal, a first pit read signal of the pits for detecting the cross-talk on the signal track corresponding to the first light spot;

a second extractor for generating, from the second read signal, a second pit read signal of the pits for detecting the cross-talk on the signal track corresponding to the second light spot;

a third extractor for generating, from the third read signal, a third pit read signal of the pits for detecting the cross-talk on the signal track corresponding to the third light spot;

a first coefficient operation unit for performing a first operation on the first and second pit read signals, and for generating a first control signal based on a result of the first operation;

a second coefficient operation unit for performing a second operation on the second and third pit read signals, and for generating a second control signal based on a result of the second operation;

a first amplifier for attenuating the first read signal in accordance with the first control signal;

a second amplifier for attenuating the third read signal in accordance with the second control signal; and a subtracter for subtracting output signals of the first and second amplifiers from the second read signal.

14. An apparatus for reproducing signals recorded on an optical disc, which comprises a signal track formed on a signal recording surface of said optical disc, and a plurality of cross-talk detection areas each formed on a portion of said signal track and including pits for detecting a cross-talk, signals being recorded on areas of said signal track other than said cross-talk detection areas, by detecting each light reflected from said optical disc to which first, second and third light spots are respectively projected onto three adjacent signal tracks of said optical disk, said apparatus comprising:

a first photodetector for receiving the reflected light of the first light spot and for generating a first read signal;

a second photodetector for receiving the reflected light of the second light spot and for generating a second read signal;

a third photodetector for receiving the reflected light of the third light spot and for generating a third read signal;

a first A/D converter for converting the first read signal into a first digital signal;

a second A/D converter for converting the second read signal into a second digital signal;

a third A/D converter for converting the third read signal into a third digital signal;

a first extractor for generating, from the first digital signal, a first pit read signal of the pits for detecting the cross-talk on the signal track corresponding to the first light spot, and for extracting levels of the first pit read signal at predetermined intervals;

a second extractor for generating, from the second digital signal, a second pit read signal of the pits for detecting the cross-talk on the signal track corresponding to the second light spot, and for extracting levels of the second pit read signal at the predetermined intervals;

a third extractor for generating, from the third digital signal, a third pit read signal of the pits for detecting the cross-talk on the signal track corresponding to the third light spot, and for extracting levels of the third pit read signal at the predetermined interval;

a first coefficient operation unit for performing a first operation on the levels of the first pit read signal and the levels of the second pit read signal, and for generating a first control signal based on a result of the first operation;

a second coefficient operation unit for performing a second operation on the levels of the second pit read signal and the levels of the third pit read signals, and for generating a second control signal based on a result of the second operation;

a first variable frequency filter for varying a frequency characteristic of the first digital signal in accordance with the first control signal;

a second variable frequency filter for varying a frequency characteristic of the third digital signal in accordance with the second control signal; and a substracter for subtracting output signals of the first and second variable frequency filters from the second digital signal.

15. An apparatus as claimed in claim 14, wherein each of said first and second variable frequency filters comprises an FIR filter.

* * * * *